(12) United States Patent
Kim et al.

(10) Patent No.: US 10,629,916 B2
(45) Date of Patent: Apr. 21, 2020

(54) PREPARATION METHOD FOR BIPOLAR PLATE FOR REDOX FLOW BATTERY

(71) Applicant: KOREA INSTITUTE OF INDUSTRIAL TECHNOLOGY, Cheonan-si (KR)

(72) Inventors: Ho Sung Kim, Gwangju (KR); Min Young Kim, Gwangju (KR); Byeong Su Kang, Damyanggun (KR); Sun Woo Yang, Gwangju (KR); Hee Sook Noh, Gwangju (KR)

(73) Assignee: KOREA INSTITUTE OF INDUSTRIAL TECHNOLOGY, Cheonan-si (KR)

( * ) Notice: Subject to any disclaimer, the term of this patent is extended or adjusted under 35 U.S.C. 154(b) by 436 days.

(21) Appl. No.: 15/506,406

(22) PCT Filed: Aug. 28, 2015

(86) PCT No.: PCT/KR2015/009088
§ 371 (c)(1),
(2) Date: Feb. 24, 2017

(87) PCT Pub. No.: WO2016/036072
PCT Pub. Date: Mar. 10, 2016

(65) Prior Publication Data
US 2018/0198137 A1 Jul. 12, 2018

(30) Foreign Application Priority Data

Sep. 1, 2014 (KR) ........................ 10-2014-0115597

(51) Int. Cl.
*H01B 1/24* (2006.01)
*H01M 8/0206* (2016.01)
*H01M 8/0213* (2016.01)
*H01M 8/0215* (2016.01)
*H01M 8/0221* (2016.01)
*H01M 8/0226* (2016.01)
*H01M 8/18* (2006.01)
*B29C 43/00* (2006.01)
*B29C 43/04* (2006.01)
*B29C 43/14* (2006.01)
*B29C 43/52* (2006.01)
*C08L 63/00* (2006.01)
*B29K 63/00* (2006.01)
*B29K 505/00* (2006.01)
*B29K 507/04* (2006.01)
(Continued)

(52) U.S. Cl.
CPC ........... *H01M 8/0226* (2013.01); *B29C 43/04* (2013.01); *B29C 43/14* (2013.01); *B29C 43/52* (2013.01); *C08L 63/00* (2013.01); *H01B 1/24* (2013.01); *H01M 8/0206* (2013.01); *H01M 8/0213* (2013.01); *H01M 8/0215* (2013.01); *H01M 8/0221* (2013.01); *H01M 8/188* (2013.01); *B29C 43/003* (2013.01); *B29C 2043/141* (2013.01); *B29C 2043/525* (2013.01); *B29K 2063/00* (2013.01); *B29K 2505/00* (2013.01); *B29K 2507/04* (2013.01); *B29K 2509/02* (2013.01); *B29L 2031/3468* (2013.01); *Y02E 60/528* (2013.01)

(58) Field of Classification Search
CPC .. H01B 1/20; H01B 1/22; H01B 1/24; H01M 8/0204; H01M 8/0206; H01M 8/0208; H01M 8/021; H01M 8/0213; H01M 8/0215; H01M 8/0217; H01M 8/0219; H01M 8/0221; H01M 8/0223; H01M 8/0226; H01M 8/023; H01M 8/0232; H01M 8/0234; H01M 8/0236; H01M 8/0239; H01M 8/0241; H01M 8/0243; H01M 8/188; B29C 43/003; B29C 43/02; B29C 43/04; B29C 43/14; B29C 43/22; B29C 43/36; B29C 43/44; B29C 43/52; B29C 44/58; B29C 2043/141; B29C 2043/525; B29C 2043/5808; B29C 2043/5816; B29C 2043/5825; B29C 2043/5875; C08L 63/00; C08L 63/04
See application file for complete search history.

(56) References Cited

U.S. PATENT DOCUMENTS 7,413,685 B2 * 8/2008 Cai ..................... B29C 43/003
252/500
8,262,970 B2 * 9/2012 Morita .................. H01L 21/566
264/272.11
(Continued)

FOREIGN PATENT DOCUMENTS

JP S5150399 A 5/1976
JP S62245198 A 10/1987
(Continued)

OTHER PUBLICATIONS

English machine translation of Lee et al. (KR 2005-0118047 A). (Year: 2005).*
(Continued)

*Primary Examiner* — Matthew R Diaz
(74) *Attorney, Agent, or Firm* — STIP Law Group, LLC (57) ABSTRACT

Disclosed is a method of manufacturing a bipolar plate for a redox flow battery. The method includes (a) mixing epoxy, a curing agent, and a conductive filler to manufacture a mixture, and (b) manufacturing the bipolar plate including a conductive filler composite manufactured by compression-molding the mixture.

10 Claims, 7 Drawing Sheets

(51) Int. Cl.
*B29K 509/02* (2006.01)
*B29L 31/34* (2006.01)

(56) References Cited

U.S. PATENT DOCUMENTS

| | | | | |
|---|---|---|---|---|
| 2005/0104047 A1* | 5/2005 | Suzuki | ............... | H01M 8/0213 252/511 |
| 2005/0142413 A1* | 6/2005 | Kimura | ............... | H01M 8/0213 429/492 |
| 2012/0018914 A1* | 1/2012 | Utashiro | ............... | B29C 33/42 264/105 |

FOREIGN PATENT DOCUMENTS

| | | | |
|---|---|---|---|
| JP | 2003288909 A | | 10/2003 |
| JP | 2005-268565 A | | 9/2005 |
| JP | 2006-286545 A | | 10/2006 |
| JP | 2006269090 A | | 10/2006 |
| JP | 2006286545 A | * | 10/2006 |
| JP | 2008078107 A | | 4/2008 |
| JP | 2008311348 A | | 12/2008 |
| JP | 2014207122 A | | 10/2014 |
| KR | 10-2005-0118047 A | | 12/2005 |
| KR | 20050118047 A | * | 12/2005 |
| KR | 10-0781628 B | | 12/2007 |
| KR | 1020080074455 A | | 8/2008 |
| KR | 1020120121568 A | | 11/2012 |
| KR | 10-1367035 B | | 2/2014 |
| KR | 10-2014-0077480 A | | 6/2014 |
| KR | 1020140077480 A | | 6/2014 |
| KR | 10-1428551 B | | 8/2014 |
| KR | 10-2014-0111724 A | | 9/2014 |

OTHER PUBLICATIONS

D.E.R. 331 Liquid Epoxy Resin Product Information Sheet from Dow Plastics. (Year: 2000).*
English machine translation of Furuya (JP 2006-286545 A). (Year: 2006).*
Dictionary of Carbon Glossary, 2000, pp. 58-59, 112-114.
First Office Action from Japanese Patent Office.
Fuel Cell, 2003, vol. 2., No. 4, pp. 69-74, Japanese Patent Office.
Kim et al., Synergy effects of hybrid carbon system on properties of composite bipolar plates for fuel cells, Journal of Power Sources, 2010, 195, pp. 5474-5480, Elsevier (Abstract).
International Search Report for PCT/KR2015/009088, dated Oct. 28, 2015.
International Search Report of PCT/KR2015/009088, dated Oct. 28, 2015, English translation.

* cited by examiner

(Surface)

(Section)

[FIG. 6]

(Upper part of trial product)

(Section of trial product)

PREPARATION METHOD FOR BIPOLAR PLATE FOR REDOX FLOW BATTERY

CROSS-REFERENCE TO RELATED APPLICATIONS

This application is the U.S. National Phase under 35 U.S.C. § 371 of International Application No. PCT/KR2015/009088 filed on Aug. 28, 2015, which in turn claims the benefit of Korean Application No. 10-2014-0115597, filed on Sep. 1, 2014, the disclosures of which are incorporated by reference into the present application.

TECHNICAL FIELD

The present invention relates to a method of manufacturing a bipolar plate for a redox flow battery. More particularly, the present invention relates to a method of manufacturing a bipolar plate for a redox flow battery that increases the content of graphite, which is a conductive filler, in order to improve electrical conductivity. In the method, a resin compounded with the graphite is prevented from flowing to the surface of the bipolar plate during compression molding, thereby overcoming a problem of greatly increased resistance. Further, low-cost and high-efficiency compression molding can be performed without damaging products and without separate extraction devices and systems, thereby manufacturing a large-area bipolar plate.

BACKGROUND ART

A redox flow secondary battery includes porous electrodes (anode and cathode) on both sides of an ion-exchange membrane (diaphragm), a bipolar plate, and a frame. The bipolar plate serves to separate cells of a stack. In the bipolar plate, conductivity is required in order to minimize the internal resistance of the battery, and an electrolyte solution must not leak to the adjacent cell, but must be completely prevented from leaking. Further, the bipolar plate is required to have high mechanical strength (tensile strength) so as to prevent thermal shrinkage in response to a pressure and temperature change caused by the electrolyte solution, and is also required to be drawable so as to prevent breakage due to slight deformation.

A conventional bipolar plate includes a conductive filler (carbon material) or structure (carbon bar), a binder resin (thermoplastic or thermosetting), and a functional additive. Conventionally, in manufacturing a separator plate or a bipolar plate of a redox flow battery (hereinafter, referred to as a 'bipolar plate'), a graphite bar is cut to a predetermined size using cutting and roughing, surface grinding is performed, a resin impregnation process is repeated 3 times or more, and precision cutting and surface grinding processes are performed to thus obtain a final product meeting a desired standard. However, the conventional process is characterized in that the cost of manufacturing the product is very high and in that the uniformity of the quality and dimensions depends on jigs, which are subject to wear.

Meanwhile, in order to solve these problems, graphite powder and thermoplastic or thermosetting binder resin powder are mixed in a dry state to manufacture a graphite composite, and the graphite composite is subjected to compression molding or injection molding using a press mold, thereby manufacturing a composite bipolar plate.

Conventional technologies have the above-described configuration, and generally use products manufactured according to a high-priced cutting method. In order to solve the problem of the product cost, the manufacture of the composite bipolar plate including the graphite and the resin is being studied using compression and injection processes.

A recently known composite bipolar plate obtained using compression molding or injection molding incurs considerably lower manufacturing cost than the conventional process using cutting and resin impregnation, but a further post-treatment process, such as surface polishing, needs to be performed due to the non-uniformity of product moldability. Therefore, the conventional technologies are limited in the ability to further reduce costs, and particularly, technology is required for selecting and dispersing a material suitable for compression and injection molding, which requires fluidity and dispersibility.

In addition, the above-described conventional technologies are based on a compact technology in which the size of a bipolar plate for fuel batteries is relatively small, for example, 100 $cm^2$, but the use of the technologies for the purpose of a bipolar plate, having a size of about 700 $cm^2$ or more, such as that of a redox flow battery, has not yet been achieved.

Further, in the case of a large-area bipolar plate, a defect rate of moldability is relatively very high, additional mold design and manufacturing costs are expected in order to maintain the uniform molding temperature and pressure of the mold, the surface of the product must be reprocessed, and moldability is poor for respective portions of the product due to the flow of a binder polymer into the surface of the product during compression molding.

In addition, the conventional technologies have problems in that a process for manufacturing the resin composite of carbon and a binder is very long and complicated, in that the intrinsic physical properties of the carbon and the polymer may be changed due to the manufacture of the composite at high temperatures and pressures, and in that expensive processing technology is required in order to uniformly control particle sizes.

DISCLOSURE

Technical Problem

Accordingly, the present invention has been made keeping in mind the above problems occurring in the related art, and an object of the present invention is to provide a method of manufacturing a bipolar plate for a redox flow battery. In the method, the content of graphite may be increased to thus improve the electrical conductivity and mechanical strength, and compression molding may be performed at low cost without damaging products and without a separate extraction device.

Technical Solution

In order to accomplish the above object, the present invention provides a method of manufacturing a bipolar plate for a redox flow battery, comprising the steps of (a) mixing epoxy, a curing agent, and a conductive filler to manufacture a mixture, and (b) manufacturing the bipolar plate by compression-molding the mixture.

The mixture may be charged in a mold, and then heated and pressurized, thereby performing the compression-molding of the step (b).

The epoxy may have an EEW (epoxy equivalent weight) of 184 to 190 g/eq, a viscosity of 11,500 to 13,500 cps, and a specific gravity of 0.8 to 1.5.

The conductive filler may be one or more selected from among a graphite, a metal, and a ceramic material.

The graphite may be a needle-shaped graphite or a spherical graphite.

The graphite may be the needle-shaped graphite.

The conductive filler may have a particle resistivity of 100 to 150 mΩ·cm, an average particle diameter of 5 to 30 μm, a specific surface area of 0.3 to 3.0 m²/g, and a density of 1.5 to 3.0 g/cm³.

The mixture may include 100 parts by weight of the epoxy, 25 to 67 parts by weight of the curing agent, and 125 to 1,510 parts by weight of the conductive filler.

The mixture may be charged in the mold while being interposed between two resin films, and may then be heated and pressurized, thereby performing the compression-molding of the step (b).

The resin film may include polyester (PET) or polyimide (PI), and preferably polyester (PET).

The method may further include passing the mixture through a sieve before the step (b) to thus uniformize the sizes of particles.

The compression-molding the mixture in the step (b) may be performed through two steps at different temperatures.

The step (b) may include (b-1) compression-molding the mixture at a temperature of 50 to 70° C. under a pressure of 80 to 200 kgf/cm², and (b-2) compression-molding the material resulting from the step (b-1) at a temperature of 100 to 160° C. under a pressure of 80 to 200 kgf/cm².

The compression-molding of each of the steps (b-1) and (b-2) may be performed for 30 min to 2 hours.

The bipolar plate manufactured using the mold may have a large area.

The bipolar plate may have an area of 600 cm² or more.

The bipolar plate may have an area of 600 to 3,500 cm².

In order to accomplish the above object, the present invention also provides a method of manufacturing a redox flow battery, the method including the above-described manufacturing method.

Advantageous Effects

As described above, in the present invention, the production cost may be drastically reduced to about 1/10 of that of a conventional process of impregnating a thermosetting resin binder into a plate obtained by cutting a graphite or carbon ingot to a predetermined thickness. Further, a bipolar plate is manufactured through a two-step compression-molding process using epoxy, and accordingly, it is easy to manufacture a large-area bipolar plate having a size of about 700 cm² or more. It is unnecessary to use a special heat stirrer for compounding a graphite and a resin, and accordingly, it is possible to reduce the cost of manufacturing the bipolar plate.

Further, in the present invention, since the amount of a graphite filler may be easily increased to up to 90 wt % of the entire bipolar plate without an expensive additive for improving conductivity such as CNT, it is possible to easily increase the electrical conductivity and the mechanical strength of the bipolar plate.

In addition, in the present invention, since a resin film is provided in a mold and a mixture including epoxy, a curing agent, and a conductive filler is then charged to thus manufacture the bipolar plate, it is possible to manufacture the bipolar plate at low cost without damaging products and without a separate extraction device.

BEST MODE

Hereinafter, preferred embodiments of the present invention will be described in detail with reference to the accompanying drawings so that the present invention is easily embodied by those skilled in the art to which the present invention belongs. However, in the following description of the operation principle of the preferred embodiment of the present invention, a detailed description of known functions or configurations incorporated herein will be omitted when it may unnecessarily obscure the subject matter of the present invention.

Further, the same reference numerals are used for portions having similar functions and effects throughout the drawings.

Terms including an ordinal number such as 'first' and 'second' to be used hereinafter may be used to describe various components, but the components are not limited to these terms. Those terms are used only for the purpose of differentiating one component from other components. For example, a first component may be referred to as a second component, and similarly, a second component may be referred to as a first component without departing from the scope of the present invention.

It is also noted that in this specification, 'connected/coupled' refers to one component that is not only directly coupled to another component but also indirectly coupled to another component through an intermediate component. Further, when any portion 'includes' any component, this means that the portion does not exclude other components, but may further include other components unless otherwise stated.

Hereinafter, a method of manufacturing a bipolar plate for a redox flow battery according to the present invention will be described.

In the method of manufacturing the bipolar plate for the redox flow battery according to the present invention, a conductive filler, a resin (epoxy and a curing agent), and an additive are prepared as raw materials.

The epoxy may have an EEW (epoxy equivalent weight) of 184 to 190 g/eq, a viscosity of 11,500 to 13,500 cps, and a specific gravity of 1.0 to 1.5.

The conductive filler may include a graphite, a metal, or a ceramic material.

Figure 1:
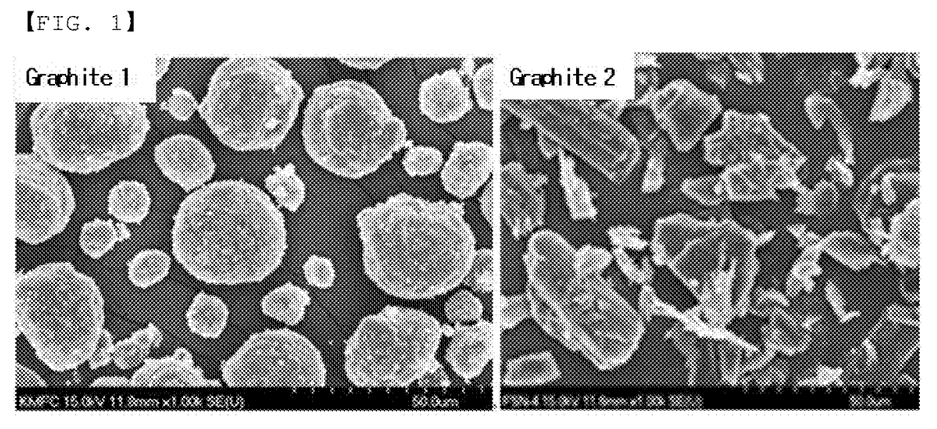
FIG. 1 shows the shape of conductive fillers used in Examples of the present invention.

The conductive filler may have a particle resistivity of 100 to 150 mΩ·cm, an average particle diameter of 5 to 30 µm, a specific surface area of 0.3 to 3.0 m$^2$/g, and a density of 1.5 to 3.0 g/cm$^3$. Preferably, the conductive filler has the physical properties shown in Table 1. For reference, the shapes of the following graphite 1 (spherical graphite) and graphite 2 (needle-shaped graphite) are shown in FIG. 1.

TABLE 1

| Item | Graphite 1 | Graphite 2 |
| --- | --- | --- |
| Particle resistivity (m · cm) | 118 | 126 |
| Average particle diameter (µm) | 10~15 | 20 |
| Specific surface area (m$^2$/g) | 0.59 | 1.8 |
| Density (g/cm$^3$) | 1.9 | 1.0 |

First, the epoxy, the curing agent, and the conductive filler are mixed to manufacture a mixture (step a).

The mixture may include 100 parts by weight of the epoxy, 25 to 67 parts by weight of the curing agent, and 125 to 1,510 parts by weight of the conductive filler.

The curing agent may be included in an amount of preferably 30 to 60 parts by weight and more preferably 35 to 55 parts by weight.

The conductive filler may be included in an amount of preferably 500 to 1400 parts by weight and more preferably 800 to 1200 parts by weight.

The epoxy and the curing agent may be present in a liquid state at room temperature even when mixed, thus being easily mixed with the graphite, which is the conductive filler.

The mixing and stirring may be performed at room temperature so that the graphite is uniformly distributed in the mixture.

Even when the mixing and stirring are performed at room temperature within the above-described mixing ratio range of the epoxy, the curing agent, and the conductive filler, uniform dispersion is feasible, and required fluidity is satisfied due to the compression-molding process.

Figure 2:
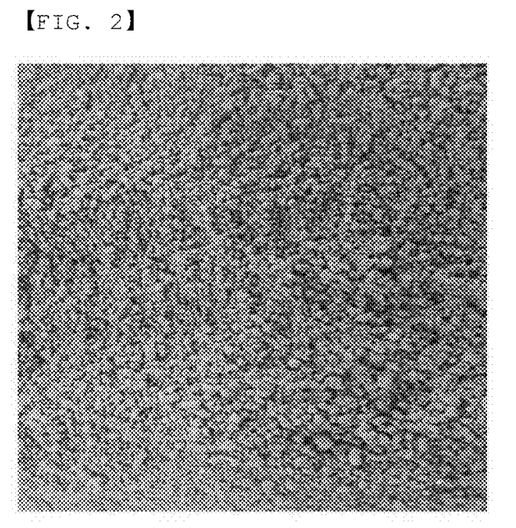
FIG. 2 shows the powder state of a mixture for a bipolar plate according to the present invention, the mixture including epoxy, a curing agent, and a conductive filler.

Meanwhile, the mixture including the epoxy, the curing agent, and the conductive filler is passed through a sieve having a predetermined diameter (for example, 1 mm) so as to ensure uniform particle size of the mixture powder, like the powder state shown in FIG. 2.

Next, the mixture is compression-molded to manufacture a bipolar plate (step b).

The mixture may be charged in a mold and then heated and pressurized, thereby performing the compression molding.

A separate extraction device is not provided in the mold. Accordingly, a resin film may be provided on the lower part of the mold before the mixture is charged so that the molding is performed without damaging products and without the separate extraction device. The resin film may include polyester (PET) or polyimide (PI), and preferably polyester (PET). Further, the compression molding may be performed after the resin film is positioned on the mixture.

The compression molding may be performed through two steps (steps b-1 and b-2) at different temperatures.

The first compression molding may be performed at a temperature of 50 to 70° C. under a pressure of 80 to 200 kgf/cm$^2$ for 30 min to 2 hours (step b-1).

Preferably, the first compression molding may be performed at a temperature of 52 to 68° C. under a pressure of 100 to 180 kgf/cm$^2$ for 40 min to 1 hour and 30 min. More preferably, the first compression molding may be performed at a temperature of 55 to 65° C. under a pressure of 110 to 160 kgf/cm$^2$ for 45 min to 1 hour and 15 min.

Next, the second compression molding may be performed at a temperature of 100 to 160° C. under a pressure of 80 to 200 kgf/cm$^2$ for 30 min to 2 hours (step b-2).

Preferably, the second compression molding may be performed at a temperature of 110 to 150° C. under a pressure of 100 to 180 kgf/cm$^2$ for 40 min to 1 hour and 30 min. More preferably, the second compression molding may be performed at a temperature of 120 to 140° C. under a pressure of 110 to 160 kgf/cm$^2$ for 45 min to 1 hour and 15 min.

The reason why the mixture is maintained at 50 to 70° C. under a predetermined pressure (step b-1) is that the optimum fluidity (flowability) is ensured at this temperature range due to the physical properties (solubility) of the epoxy, thus increasing the moldability between the resins in the mold. When the temperature is 70° C. or higher, flowing is stopped, which leads to a curing reaction. When the temperature is increased to 100 to 160° C. under the same pressure, the epoxy is completely cured, thereby finishing the molding process.

Figure 3:
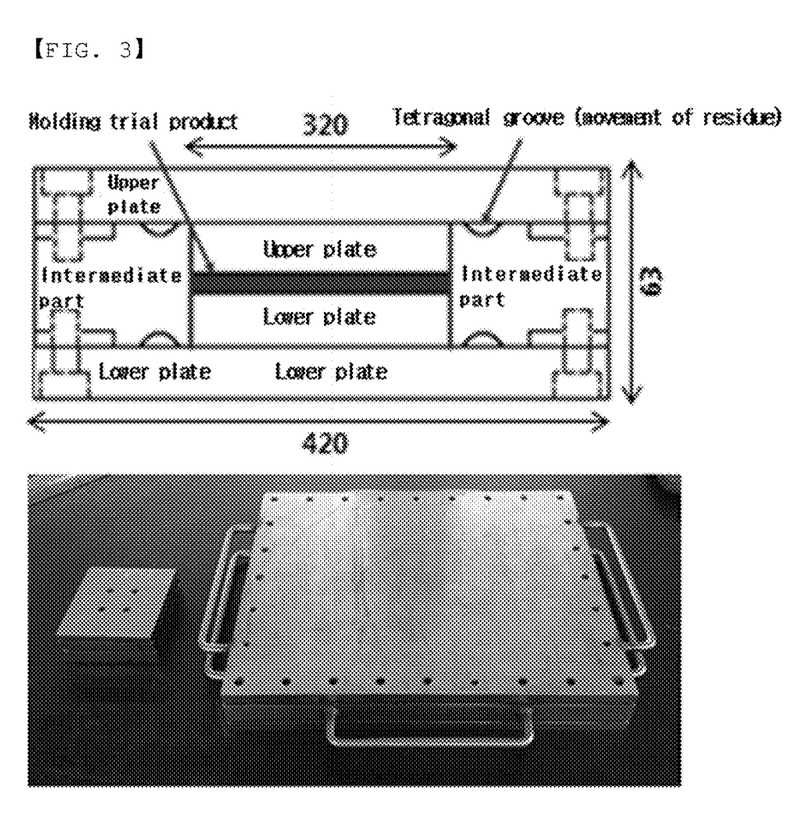
FIG. 3 is a schematic view showing a mold for compression molding, provided to describe a method of manufacturing the bipolar plate according to the present invention.

Meanwhile, the mold is designed so that the molding quality of products is excellent during molding at a predetermined temperature under a predetermined pressure and so that it is easy to extract the products from the mold without the separate extraction device. In other words, as shown in FIG. 3, the mold includes an upper plate, a lower plate, and an intermediate part for supporting the upper plate and the lower plate. A space to be filled with the mixture is formed between the upper plate and the lower plate, and grooves (for example, tetragonal grooves) are formed in both surfaces of the intermediate part. The groove corresponds to another space through which residue, flowing from the space between the upper plate and the lower plate due to compression during the compression-molding process, moves. Due to the grooves, the upper plate and the lower plate do not come into close contact with each other during the compression-molding process, and the molded structure is easily extracted.

In addition, when the mold is prepared, the lower plate and the intermediate parts are assembled, the resin film is provided on a portion of the lower plate that is disposed between the intermediate parts, and the mixture is charged thereon and uniformly spread. Next, the resin film is situated on the mixture, the upper plate and the intermediate parts are assembled, and compression molding is performed in a hot press.

Figure 4:
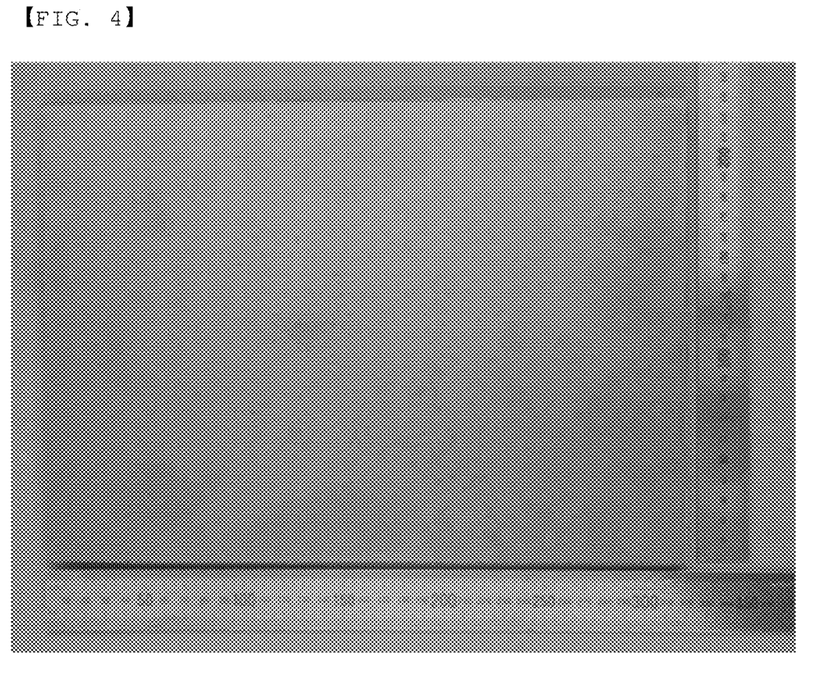
FIG. 4 shows a bipolar plate trial product manufactured using the method of manufacturing the bipolar plate for the redox flow battery according to the present invention.
Figure 5:
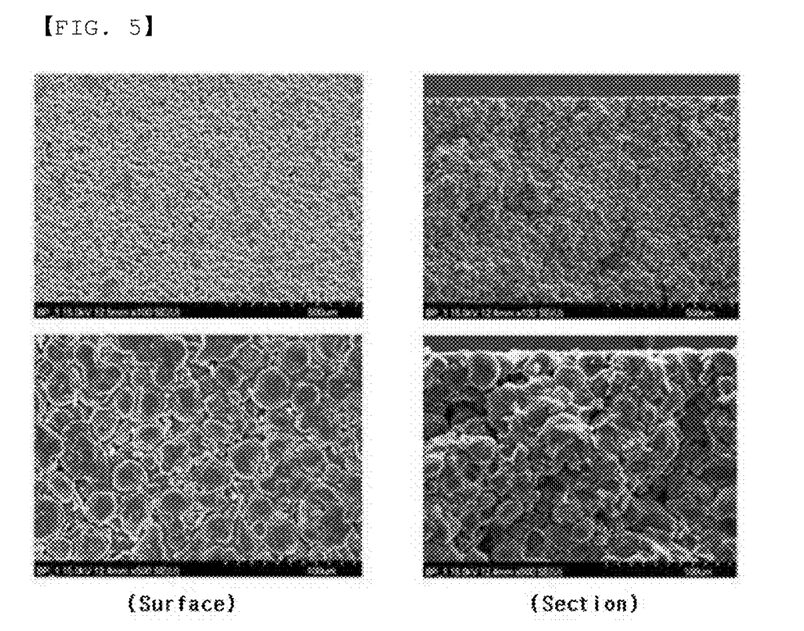
FIG. 5 shows the results of SEM analysis of the surface and the section of the bipolar plate trial product manufactured using the method of manufacturing the bipolar plate for the redox flow battery according to the present invention.
Figure 6:
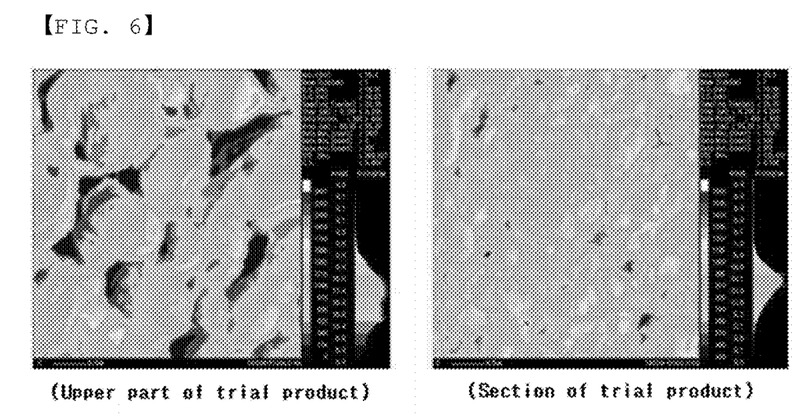
FIG. 6 shows the results of EPMA analysis of the section of the bipolar plate trial product manufactured using the method of manufacturing the bipolar plate for the redox flow battery according to the present invention.

From FIGS. 4 to 6, it can be seen that the graphite is uniformly dispersed on the section and the surface of the trial product manufactured under the above-described condition. After the compression molding, a bipolar plate having excellent conductivity may be manufactured during extraction without quality problems such as breakage or cracking.

The bipolar plate manufactured using the mold may have a large area, and the area may be 600 cm$^2$ or more. The bipolar plate may have an area of preferably 600 to 3,500 cm$^2$, and more preferably 600 to 2,500 cm$^2$.

Further, the present invention provides a method of manufacturing a redox flow battery, the method including the method of manufacturing the bipolar plate for the redox flow battery.

MODE FOR INVENTION

Example 1

An epoxy, a curing agent, and a spherical graphite (a graphite 1 in Table 1) were prepared as starting materials, and the epoxy and curing agent were mixed at a ratio of 7:3 and then uniformly stirred, thereby manufacturing a thermosetting epoxy. The spherical graphite filler and the thermosetting epoxy were mixed and stirred at a ratio of 9:1 at room temperature using a general stirrer to manufacture a mixture, and the mixture was then passed through a sieve having a diameter of 1 mm.

Thereafter, one polyester (PET) film was laid on the lower part of a mold, the mixture was charged in a rectangular hole (32 cm×23 cm) in the mold, the mixture was covered with the polyester film, first compression molding was performed at a molding temperature of 60° C. under a pressure of 136 kg/cm$^2$ for 1 hour, and a process for releasing the pressure was repeated about 5 times for 1 min in order to discharge the gas from the mold. Further, after the temperature of the mold was increased to 130° C. under a pressure of 136 kg/cm$^2$, second compression molding was performed for 1 hour to thus manufacture a bipolar plate.

Example 2

The bipolar plate was manufactured using the same material and process as in Example 1, except that the graphite, which was the conductive filler, was changed to a needle-shaped type (a graphite 2 in Table 1).

TEST EXAMPLE

Test Example 1: Measurement of Electric Resistance of Bipolar Plate

Figure 7:
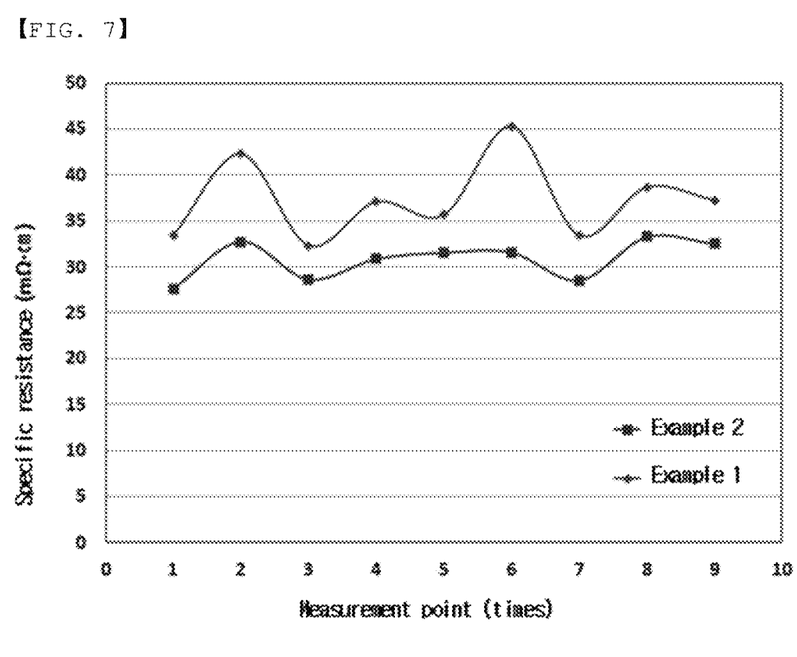
FIG. 7 is a graph showing the result of measurement of the electric resistance of the bipolar plate manufactured using the method of manufacturing the bipolar plate for the redox flow battery according to the present invention.

FIG. 7 shows the result of measurement of the electric resistance of the bipolar plate manufactured according to Examples 1 and 2 of the present invention.

Referring to FIG. 7, the electric resistance of the bipolar plate manufactured using the spherical graphite of Example 1 was found to be about 30 to 45 mΩ·cm (average 37 mΩ·cm). Further, the electric resistance of the bipolar plate manufactured using the needle-shaped graphite of Example 2 was found to be about 27 to 33 mΩ·cm (average 31 mΩ·cm). Accordingly, the bipolar plate of Example 2 was superior to that of Example 1 in terms of the electric resistance. It was also found that the bipolar plate manufactured in Example 2 exhibited more uniform distribution of specific resistance than the bipolar plate of Example 1.

Test Example 2: Measurement of Bending Strength and Gas Permeability of Bipolar Plate FIG. 8 shows the result of measurement of the bending strength of the bipolar plate manufactured according to Examples 1 and 2 of the present invention, and FIG. 9 shows the result of measurement of the gas permeability thereof.

Figure 8:
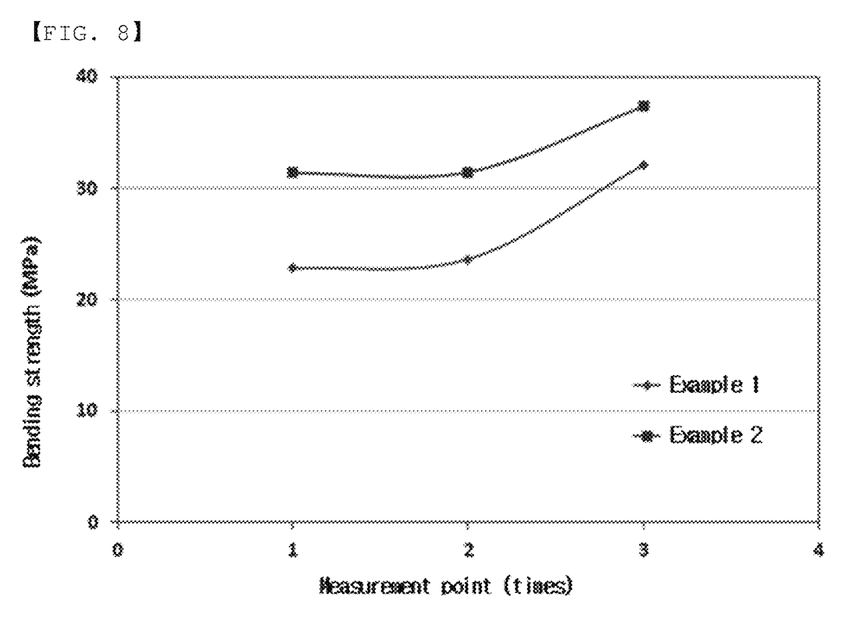
FIG. 8 is a graph showing the result of measurement of the bending strength of the bipolar plate manufactured using the method of manufacturing the bipolar plate for the redox flow battery according to the present invention.

Referring to FIG. 8, the bipolar plate including the spherical graphite of Example 1 had a bending strength of about 23 to 33 MPa (average 26 MPa). The bipolar plate including the needle-shaped graphite of Example 2 had an average bending strength of 33 MPa, which was higher than that of Example 1.

Figure 9:
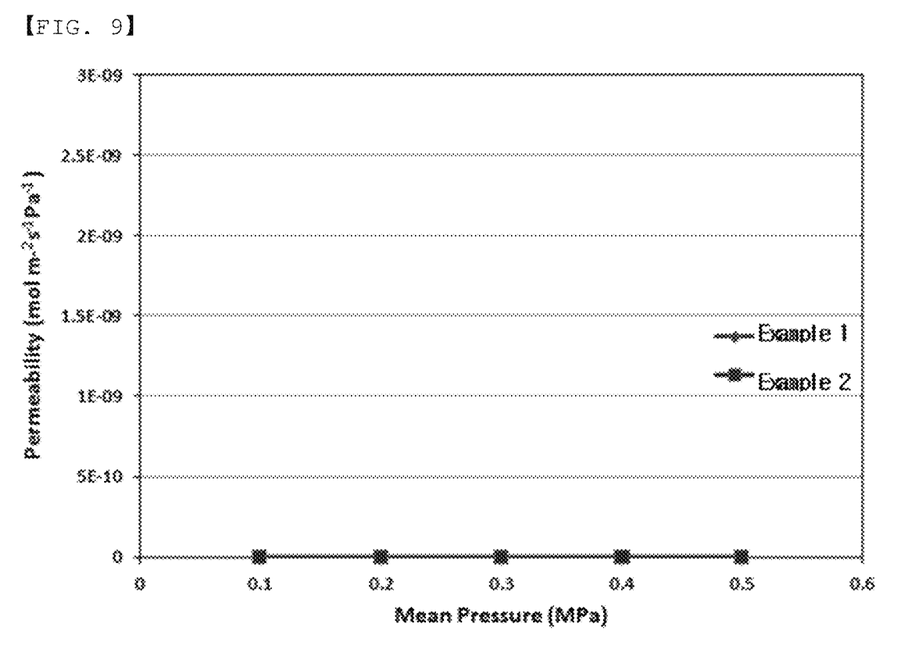
FIG. 9 is a graph showing the result of measurement of the gas permeability of the bipolar plate manufactured using the method of manufacturing the bipolar plate for the redox flow battery according to the present invention.

Further, referring to FIG. 9, the gas permeability of the bipolar plate including the spherical graphite of Example 1 was maintained at 0 regardless of the measured pressure. The gas permeability of the bipolar plate including the needle-shaped graphite of Example 2 was also maintained at 0 regardless of the measured pressure. For reference, the graph of Example 1 is hidden by the graph of Example 2 in FIG. 9.

Referring to Test Examples 1 and 2, the electric resistance and compressive strength of the bipolar plate manufactured according to Example 2 were measured in the same manner as in Example 1, and as a result, the average electric resistance was found to be about 31 mΩ·cm, which was lower than that of Example 1, and the bending strength was found to be 33 Mpa, which was higher than that of Example 1. Even though the needle-shaped graphite material had high electric resistance, the resultant electric resistance of the product molded using the needle-shaped graphite material was superior to that obtained using the spherical graphite. The reasons are that the needle-shaped structure has a specific surface area about three times as large as that of the spherical structure and that it is more advantageous to ensure an electron movement path in the needle-shaped structure than in the spherical structure. Based on this reason, the needle-shaped structure provides slightly higher compressive strength compared to the spherical structure. Meanwhile, the results of the present invention obtained using the two types of graphite materials are very close to a marketable level.

As described above, in the method of manufacturing the bipolar plate for the redox flow battery according to the embodiment of the present invention, the production costs may be drastically reduced to about ⅟10 of that of a conventional process of impregnating a thermosetting resin binder into a plate obtained by cutting a graphite or carbon ingot to a predetermined thickness. Further, the bipolar plate is manufactured through a two-step compression-molding process using epoxy, and accordingly, it is easy to manufacture a large-area bipolar plate having a size of about 700 cm$^2$ or more. It is unnecessary to use a special heat stirrer for compounding a graphite and a resin, and accordingly, it is possible to reduce the cost of manufacturing the bipolar plate.

Further, in the method of manufacturing the bipolar plate for the redox flow battery according to the embodiment of the present invention, since the amount of the graphite filler may be easily increased to up to 90 wt % of the entire bipolar plate without an expensive additive for improving conductivity, such as CNT, it is possible to easily increase the electrical conductivity and the mechanical strength of the bipolar plate.

In addition, in the method of manufacturing the bipolar plate for the redox flow battery according to the embodiment of the present invention, a resin film is provided on the lower part of a mold, a mixture including epoxy, a curing agent, and a conductive filler is charged, and another resin film is provided on the mixture to thus manufacture the bipolar plate. Accordingly, it is possible to manufacture the bipolar plate at low cost without damaging products and without a separate extraction device.

While the present invention has been described in connection with what is presently considered to be the most practical and preferred embodiment, it is to be understood that the invention is not limited to the disclosed embodiments. It will be apparent to those skilled in the art that various modifications and variations can be made in the present invention without departing from the spirit of the invention. Therefore, the scope of the present invention should not be limited to the embodiments described, but should be defined by the following claims as well as equivalents thereof.

INDUSTRIAL APPLICABILITY

As described above, in the present invention, the production cost may be drastically reduced to about 1/10 of that of a conventional process of impregnating a thermosetting resin binder into a plate obtained by cutting a graphite or carbon ingot to a predetermined thickness. Further, a bipolar plate is manufactured through a two-step compression-molding process using epoxy, and accordingly, it is easy to manufacture a large-area bipolar plate having a size of about 700 cm$^2$ or more. It is unnecessary to use a special heat stirrer for compounding a graphite and a resin, and accordingly, it is possible to reduce the cost of manufacturing the bipolar plate.

Further, in the present invention, since the amount of a graphite filler may be easily increased to up to 90 wt % of the entire bipolar plate without an expensive additive for improving conductivity such as CNT, it is possible to easily increase the electrical conductivity and the mechanical strength of the bipolar plate.

In addition, in the present invention, since a resin film is provided in a mold and a mixture including epoxy, a curing agent, and a conductive filler is then charged to thus manufacture the bipolar plate, it is possible to manufacture the bipolar plate at low cost without damaging products and without a separate extraction device.

The invention claimed is:

1. A method of manufacturing a bipolar plate for a redox flow battery, comprising steps of:
   (a) mixing an epoxy, a curing agent, and a conductive filler to manufacture a mixture; and
   (b) manufacturing the bipolar plate including a conductive filler composite by compression-molding the mixture, wherein the mixture is charged in a mold and then heated and pressurized, thereby performing the compression-molding of the step (b),
   wherein the step (b) comprises:
   (b-1) compression-molding the mixture at a temperature of 50 to 70° C. under a pressure of 80 to 200 kgf/cm$^2$; and
   (b-2) compression-molding a material resulting from the step (b-1) at a temperature of 100 to 160° C. under a pressure of 80 to 200 kgf/cm$^2$, and
   wherein the conductive filler is a needle-shaped graphite.

2. The method of claim 1, wherein the epoxy has an EEW (epoxy equivalent weight) of 184 to 190 g/eq, a viscosity of 11,500 to 13,500 cps, and a specific gravity of 1.0 to 1.5.

3. The method of claim 1, wherein the conductive filler has a particle resistivity of 100 to 150 mΩ·cm, an average particle diameter of 5 to 30 μm, and a specific surface area of 0.3 to 3.0 m$^2$/g.

4. The method of claim 1, wherein the mixture includes 100 parts by weight of the epoxy;
   25 to 67 parts by weight of the curing agent; and
   125 to 1,510 parts by weight of the conductive filler.

5. The method of claim 1, wherein the mixture is charged in the mold while being interposed between two resin films and is then heated and pressurized, thereby performing the compression-molding of the step (b).

6. The method of claim 5, further comprising:
   passing the mixture through a sieve before the step (b).

7. The method of claim 1, wherein the compression-molding of each of the steps (b-1) and (b-2) is performed for 30 min to 2 hours, respectively.

8. The method of claim 1, wherein the bipolar plate has an area of 600 cm$^2$ or more.

9. The method of claim 8, wherein the bipolar plate has an area of 600 to 3,500 cm$^2$.

10. A method of manufacturing a redox flow battery, the method comprising:
    a step of forming a bipolar plate according to the method of manufacturing a bipolar plate according to claim 1.

* * * * *